Figure 1:
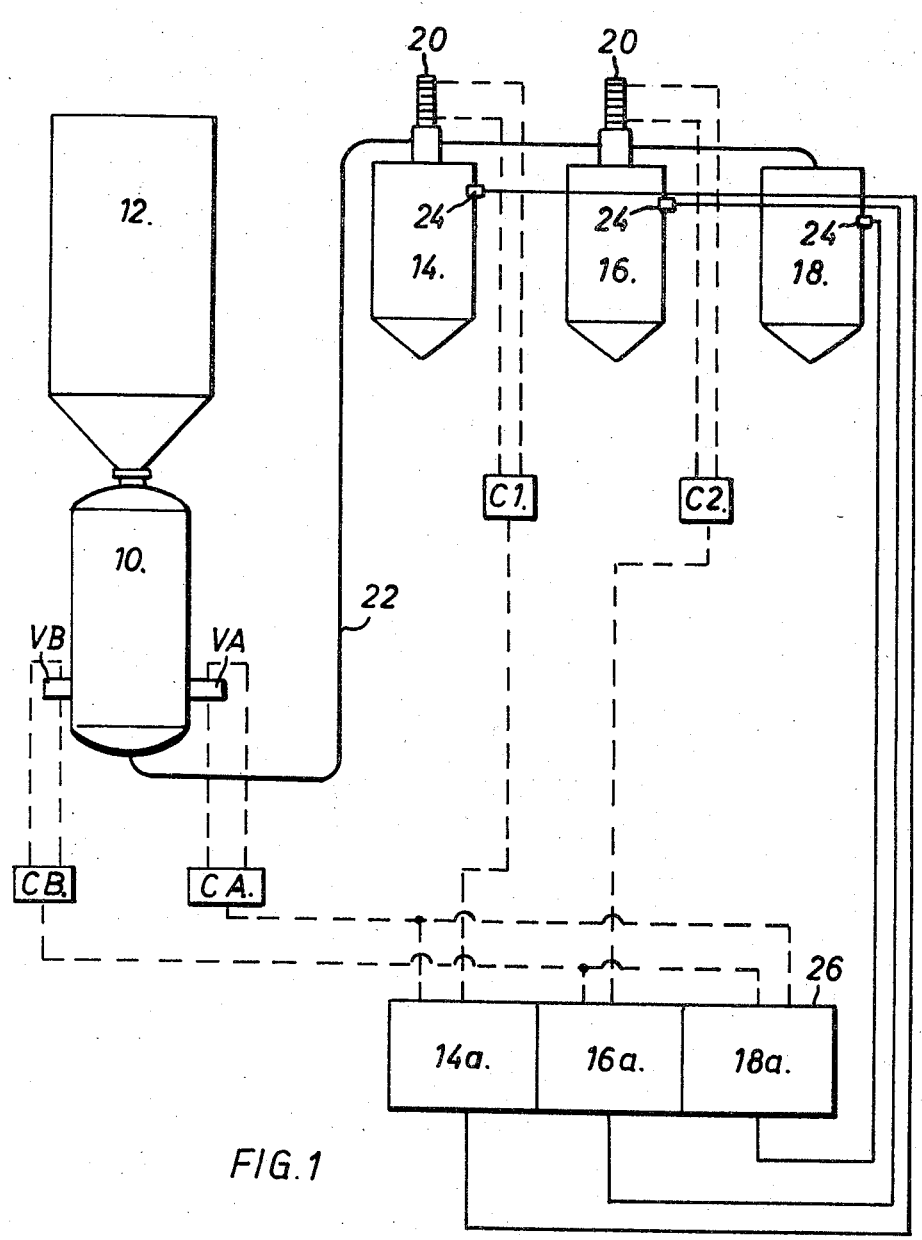

United States Patent [19]
Trythall

[11] 3,854,778
[45] Dec. 17, 1974

[54] MATERIAL HANDLING PLANTS
[75] Inventor: William John Courtney Trythall, Whitley Bay, England
[73] Assignee: Trythall Design & Development Limited, East Mill, Morpeth Northumberland, England
[22] Filed: Oct. 26, 1973
[21] Appl. No.: 409,968

[52] U.S. Cl. .................. 302/27, 302/28, 302/53, 302/57
[51] Int. Cl. ............................................ B65g 53/14
[58] Field of Search .................. 417/2–8, 12; 302/3, 27, 28, 35, 42, 51–54, 57; 243/3, 11, 14, 17, 25–27

[56] References Cited
UNITED STATES PATENTS

| | | | |
|---|---|---|---|
| 1,857,643 | 5/1932 | Kinyon | 302/28 |
| 3,077,365 | 2/1963 | Fisher | 302/28 |
| 3,195,960 | 7/1965 | Trythall | 302/53 |
| 3,365,242 | 1/1968 | Marchetti | 302/53 |
| 3,393,016 | 7/1968 | Van Doorn et al. | 302/35 |
| 3,473,788 | 10/1969 | Kelly | 302/28 X |
| 3,586,383 | 6/1971 | Trythall | 302/53 |

Primary Examiner—Evon C. Blunk
Assistant Examiner—W. Scott Carson
Attorney, Agent, or Firm—Larson, Taylor and Hinds

[57] ABSTRACT

A material handling plant for conveying powder or granular material by a compressed fluid to a selected one of a plurality of receiving points, wherein a plurality of material divertor valves are each disposed in a pipe system to control the flow of material from material conveying apparatus to a respective one of the receiving points, and wherein means is provided for automatically producing a plurality of different predetermined amounts of compressed fluid, whereby in plant use an appropriate one of said amounts can be employed to enable said apparatus to convey material to a selected one of said receiving points.

11 Claims, 3 Drawing Figures

MATERIAL HANDLING PLANTS

This invention relates to material handling plants of the kind in which a powder or granular material is to be conveyed by compressed air through pipes to more than one receiving point in a processing plant.

In such plants the material is initially fed from a hopper into a material supply apparatus that can subsequently be sealed from the hopper and thereafter compressed air is passed into the supply apparatus to cause the material to be discharged into the pipeline.

An air reservoir may be provided between the air compressor and the material supply apparatus in order to provide the momentarily high demand for compressed air of such apparatus during the period when blowing is taking place.

The material supply apparatus may be provided with its own compressed air reservoir.

A difficulty arises, however, when such material supply apparatus are used to deliver material to two or more receiving points in a pipe system wherein the distances from the supply apparatus may vary widely; the nearest receiving point may be 50 ft only from the supply vessel and the furthest one as much as 300 ft away.

The amount of compressed air available to meet the high momentary demand during blowing has to be sufficient to reach the furthest receiving point in the pipe system. Consequently there will be a tendency to overblow to each of the receiving points nearer to the supply apparatus.

This results in waste of compressed air. Also where the material is dusty and filtering equipment is provided between the blowing system and the atmosphere the filters serving those nearer receiving points may be placed under undue strain or become choked.

It is an aim of the present invention to reduce or overcome the above mentioned difficulties.

According to the invention there is provided a material handling plant for conveying powder or granular material by a compressed fluid to a selected one of a plurality of receiving points, the plant comprising a hopper, a material conveying apparatus for receiving material from the hopper, a plurality of material receiving points at different distances from said apparatus and in communication with said apparatus via a pipe system, a plurality of material divertor valves each disposed in the pipe system to control the flow of material to a respective one of the receiving points, and means for automatically producing a plurality of different predetermined amounts of compressed fluid whereby in plant use an appropriate one of said amounts of compressed fluid can be employed to enable said apparatus to convey material to a selected one of said receiving points.

According to the invention there is also provided a material handling apparatus comprising a vessel separated by a bulkhead into upper and lower spaces, the upper space being further divided by walls into separate chambers one defining an air reservoir and another a material receptacle with a closable inlet, the material chamber extending through the bulkhead to communicate with the lower space, the lower space having a material outlet, a further air reservoir provided within the vessel, and valves operable to put one or both reservoirs into communication with the lower space to sweep material therefrom toward said outlet.

Figure 2:
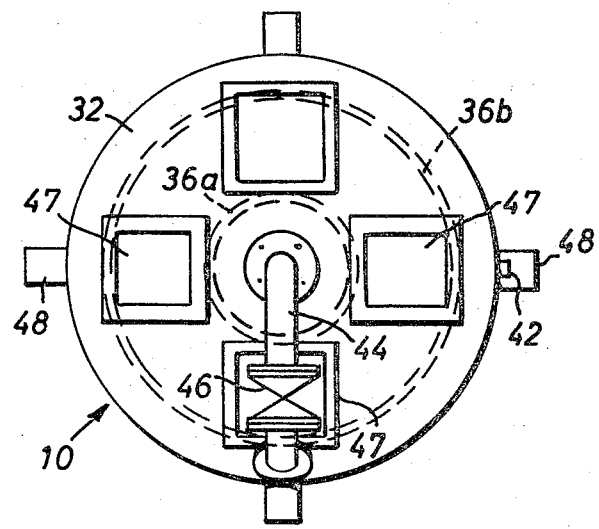
Figure 2:
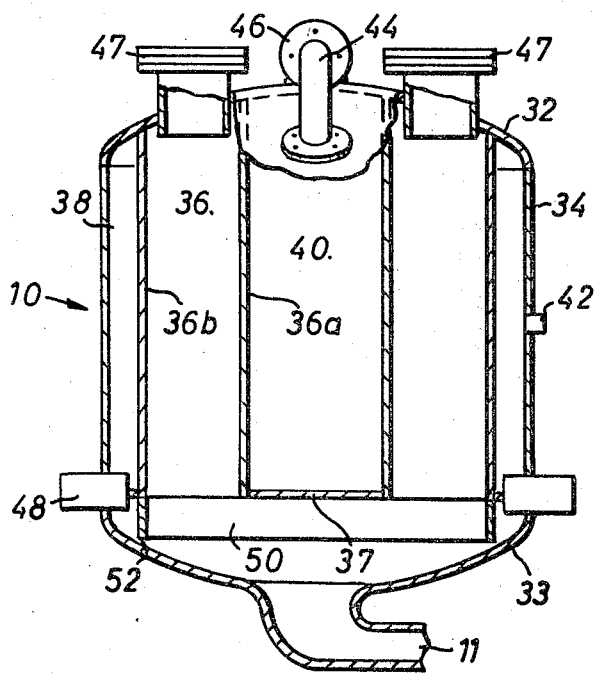
Figure 3:
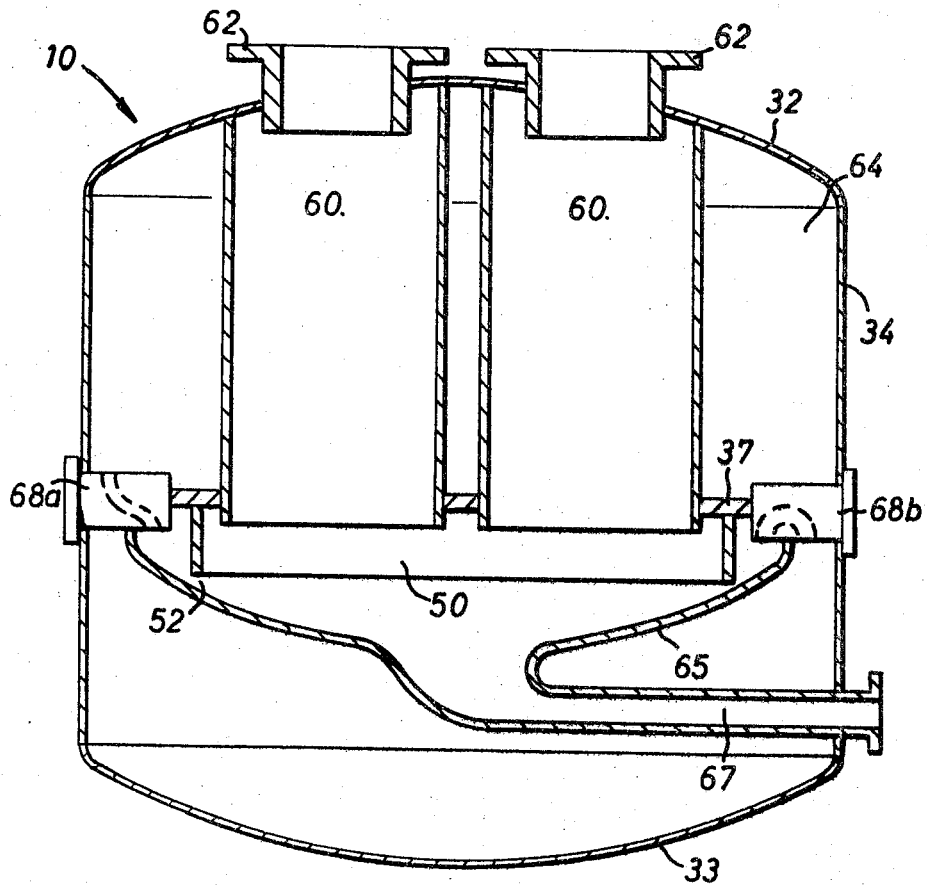

An embodiment of the invention will now be described by way of example only with reference to the accompanying drawings in which:

FIG. 1 is a diagrammatic representation of a material handling plant according to the invention, FIG. 2 is a plan view and section respectively of material handling apparatus for the plant of FIG. 1, and FIG. 3 is a longitudinal section of another embodiment of material handling apparatus for the plant of FIG. 1.

Referring to FIG. 1 of the drawings, the plant includes a material supply apparatus 10 which is fed from a main material hopper 12 and which feeds a series of three material receiving hoppers 14,16,18 via two divertor valves 20 each mounted on a respective one of hoppers 14 and 16. Apparatus 10 may include two different sized air reservoirs provided within the apparatus which can be selectively or together put into communication with the material chamber of the apparatus via air control valves VA controlling the smaller air reservoir and VB controlling the larger air reservoir; such apparatus will be described in more detail later in the present specification.

The divertor valves 20 conveniently comprise a housing having an inlet and two outlets and a piston slidable in the housing between two limit positions, the piston having a first flow path therethrough which in one limit position puts the inlet into communication with one of the outlets and a second flow path which in the other limit position puts the inlet into communication with the other of the outlets; the pistons of the divertor valves are operated pneumatically to either divert the material from a delivery pipeline 22 into the hopper on which it is mounted or to pass the material to the next divertor valve or hopper.

Each hopper 14,16,18 is provided with a level controller 24 say of the probe or paddle type, each designed to emit an electrical signal when the level of material falls in a respective hopper.

Both the air valves VA and VB and the divertor valves 20 are pneumatically operated by double-acting air cylinders and are controlled by known forms of four-way control valves CA, CB, C1 and C2 of either pilot or solenoid type. If the four control valves are, for instance, of the single solenoid spring return type they will be wired so that when they are energised they will open their respective valves VA and VB, and in the case of the divertor valves place them in the position to divert the material into the hopper on which the divertor is mounted.

A master control panel 26 is provided housing three sets of switches 14a, 16a, 18a which will, on receiving an electrical signal from one of the level controllers 24, pass a further signal to the appropriate solenoid valves located in the boxes.

Thus, if the material level in hopper 14 falls then the level controller 24 of that hopper will emit a signal which will result in its divertor 20 being set to divert material into the hopper and valve VA will open to allow the smaller volume of compressed air to be used.

If the level controller in hopper 16 emits a signal the result will be to energise the control valve C2 and open air valve VB so that the larger volume of compressed air will be used.

If, on the other hand, the level controller in hopper 18 emits a signal then neither of the divertor controls will be energised and the material will pass through them, but both valves VA and VB will be opened allowing the use of the full compressed air capacity in both air reservoir spaces. The signals will cease when the levels are restored to the correct level.

The control valves CA, CB, C1 and C2 need not be electrically operated but may be operated by a pilot air circuit in which case the switches in the master control cabinet would be replaced by pilot air valves operated by solenoids and the connections between the cabinet and the boxes would be smallbore piping instead of electrical wiring.

Referring to FIG. 2, one form of material handling apparatus 10 includes a vessel provided by upper and lower domed ends 32 and 33 respectively secured together as by welding to a cylindrical member 34. Extending downwardly from the upper domed end to which they are secured are two spaced cylindrical walls 36a and 36b defining between them an annular material receiving chamber 36; the lower ends of walls 36a and 36b are spaced from the lower domed end 3 and are secured to, and pass through, a bulkhead 37 located transversely of the vessel. The walls 36a and 36b separate the space above the bulkhead into chamber 12 and into two further spaces 38 and 40 usable as air reservoir; space 38 is supplied with air through inlet 42 and space 40 is supplied with air through pipe 44 interconnecting the two spaces and having a valve 46 to close the pipe if and when required.

Provided in the upper domed end 32 are a plurality in this case four, pneumatically operated slide valves 47 each positioned immediately over the annular chamber 36.

The bulkhead 37 is secured in airtight fashion to both the cylindrical members 34 and the walls 36a and 36b. At the junction of bulkhead and outer shell of the vessel one or more air valves 48 corresponding to valves VA and VB (FIG. 1), are provided. These have an inlet port opening into the air reservoir 38 above the bulkhead 37 and an outlet port opening into the space between the bulkhead and the lower domed end. Each port connects to the other through a valve seat. Engageable with the seat is a valve plunger operable by compressed air.

Secured to the underside of the bulkhead radially inwards of the air valves 38 is an annular ring 50 extending downwardly to within an accurately determined distance of the lower domed end 3 to provide a gap 52. The lower domed end is provided with a central discharge opening 11.

The material handling apparatus operates as follows. With the valves 48 closed, the slide valves 47 are opened to allow material to pass from a hopper or bunker (not shown) into the material chamber 36 and also the space between the bulkhead 47 and the lower domed end 33. At the same time the air reservoirs 38 and 40 are filing with compressed air through inlet 1a and pipe 44.

When the material chamber is full, the slide valves 47 are closed and valve 46 remains open if the material is to be conveyed some distance from apparatus 10 or is closed rendering only space 38 effective if the material is to be conveyed to a point close to the apparatus. The air valves 48 are then opened and the stored volume of compressed air then passes through the valves 48 into the annular space defined by end 33 and ring 50 and through the gap 52. A high velocity layer of air is thereby produced which passes over the inner face of the lower domed end to sweep the material towards the central discharge opening 11 and into the transporting pipeline. Thus the material lying on domed end 33 will be "eroded" from the underside thereof and transported into the pipeline. The level of the material in chamber 36 will fall at a steady rate until the last particles have fallen onto the air-swept surface and are swept from the apparatus.

By avoiding the need to convey the compressed air from a distant air reservoir through pipes the operating cycle is speeded up. The large total filling aperture provided by the multiplicity of slide valves 47 decreases the time taken to fill the material chamber.

The sequence of operation of the valves 47 and 48 can be effected automatically by means of sensing the level of material within the material chamber or by a timing device or by sensing the rise and fall in the air pressure within the air reservoirs. Any of the valves may be operated electrically or hydraulically.

The embodiment of apparatus 10 of FIG. 3 includes a vessel comprising upper 32 and lower 33 domed ends joined by a cylindrical member 34 as in FIG. 2, and a bulkhead 37 extending transversely across the vessel. However, the annular chamber 36 is replaced by a plurality of separate chambers 60 each with its own valve controlled inlet 62; in this embodiment a single air reservoir 64 is provided above the bulkhead 37.

There is a smaller inverted domed end 65 and annular ring 52 attached to the underside of the bulkhead, and the material outlet aperture 11 is in this smaller domed end with its horizontal outlet pipe 67 emerging from the side of the apparatus above the lower domed end. The outlet can, of course, be taken downwards and through the centre of the domed end 2 as in FIG. 1, but in this case the height of the vessel would be increased.

This arrangement provides a second air reservoir between the outer surface of the smaller domed end 25 and the inner surface of the lower domed end 3.

Either or both these air reservoirs can be used by the operation of valves 68a or 68b corresponding to valves VA and VB (FIG. 1). Valve 68a connects the upper air reservoir to the annular gap 52. Valve 68b connects the lower air reservoir to the same annular gap.

Thus, three different volumes of compressed air can be applied at the time of blowing to deliver material more efficiently to three or more points along a pipeline, one of which may be close to the apparatus (when Valve 68b would open) another at a further distance (when valve 68a would open) and a third at a very much greater distance when valves 68a and 68b would be opened simultaneously to apply the full volume of compressed air available.

If desired, air pressure may be applied either on top of the material in the chamber or chambers or at any point in their length.

Although throughout we have shown the material chamber members to be of cylindrical form, they may be in the form of a narrow cone either way up, or any such form where the diameter varies at one end from the other or along its length.

Likewise again there has been reference throughout to domed ends, meaning the standard form of dished ends made in quantities by many specialist suppliers. The use of a wide-angled cone either at the top or bottom, or within the vessel of FIG. 3, could also be employed.

Where an unlimited supply of air is available, the material supply apparatus need not have an integral air reservoir, in which case the valves CA and CB would contain preset electrical timers to provide three different lengths of blowing time at the air pressure delivered from the air compressor.

Where the material supply apparatus is provided with compressed air from a single integral air reservoir, the reservoir would contain just sufficient volume of air to blow to the furthest receiving point and valves CA and CB would contain pressure switches. One of these valves would be adjusted to close the air valve VA relatively early in the blowing cycle. The other would be adjusted to allow more of the available compressed air to be used. When hopper 18 emitted a signal neither pressure switch would operate and the full volume of the air reservoir would be allowed to exhaust into the supply apparatus.

For the sake of simplicity reference has been to a pneumatic handling system containing three receiving points only. In practice there may be many more either distributed along a single pipeline, or by the early use of Y form divertor valves in the pipeline distributed along two or more branches; the material handling apparatus may include more than two separate air chambers.

Instead of the plant being automatic as described the signal from the level indicators 24 may be used to warn the operator of the plant to set manually the required divertor valve and operate the required air valve.

I claim:

1. A material handling plant for conveying powder or granular material by a compressed fluid to a selected one of a plurality of receiving points, the plant comprising a hopper, a material conveying apparatus for receiving material from the hopper, a plurality of material receiving points at different distances from said apparatus and in communication with said apparatus via a pipe system, a plurality of material divertor valves each disposed in the pipe system to control the flow of material to a respective one of the receiving points, and means for automatically producing a plurality of different predetermined amounts of compressed fluid whereby in plant use an appropriate one of said amounts of compressed fluid can be employed to enable said apparatus to convey material to a selected one of said receiving points.

2. Plant according to claim 1, wherein said means is provided by a plurality of fluid reservoirs of different size and connected to a supply of compressed fluid.

3. Plant according to claim 2, wherein the reservoirs form an integral part of the material conveying apparatus.

4. Plant according to claim 1, wherein said means is provided by a valve connected to a supply of compressed fluid and controlled by a timer to provide the valve with a plurality of different length blowing periods.

5. Plant according to claim 1, wherein said means is provided by a single reservoir connected to a supply of compressed fluid, and by pressure responsive valves operable to close at different pressures to permit different amounts of fluid to be supplied by the reservoir.

6. Plant according to claim 1, including a plurality of hoppers, one at each material receiving point, a plurality of material level controllers one for each hopper and each operable to emit a signal when the level in its respective hopper reaches a predetermined low limit, and means responsive to the emittance of a signal from any one of the controllers to automatically actuate the divertor valve of the appropriate hopper to permit material to enter that hopper and to automatically bring into effect an appropriate one of said amounts of compressed fluid to convey material to that hopper via its divertor valve.

7. A material handling apparatus comprising a vessel separated by a bulkhead into upper and lower spaces, the upper space being further divided by walls into separate chambers one defining an air reservoir and another a material receptacle with a closable inlet, the material chamber extending through the bulkhead to communicate with the lower space, the lower space having a material outlet, a further air reservoir provided within the vessel, and valves operable to put one or both reservoirs into communication with the lower space to sweep material therefrom toward said outlet.

8. Apparatus according to claim 7, and including an annular wall spaced from a lower wall of the lower space to define an annular gap which forms the air from the reservoir or reservoirs into an annular air stream to sweep the lower wall to move material therefrom toward said outlet.

9. Apparatus according to claim 7, and including a plurality of material receptacles each with its own closable inlet and each passing through the bulkhead into the lower space.

10. Apparatus according to claim 7, wherein the further reservoir is located above the bulkhead and surrounds the first mentioned reservoir.

11. Apparatus according to claim 7, wherein the vessel is generally cylindrical in shape and wherein the further reservoir is spaced axially of the first mentioned reservoir.

* * * * *